March 5, 1929.  A. OLSON  1,704,207
AUTOMATIC RELEASING MECHANISM
Filed March 11, 1925   2 Sheets-Sheet 1
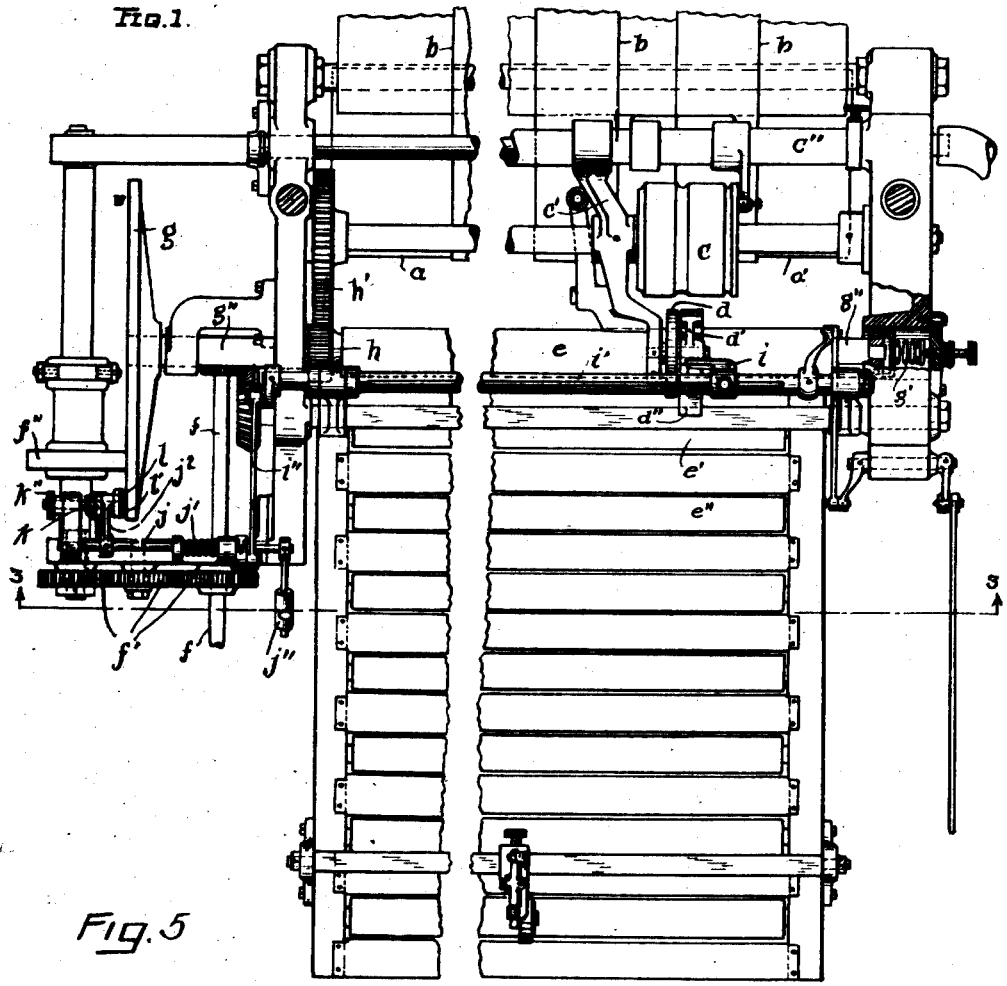
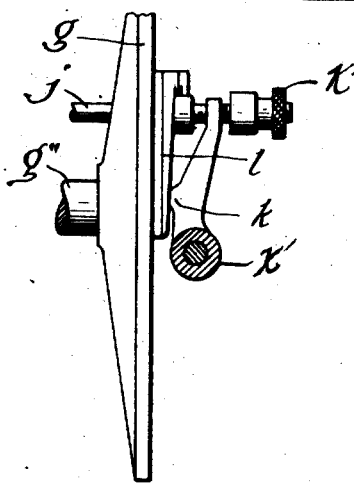
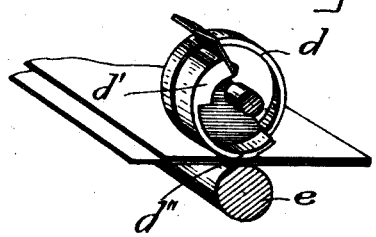
Inventor
ANDREW OLSON.
Attorney Inventor
ANDREW OLSON Patented Mar. 5, 1929.

1,704,207

UNITED STATES PATENT OFFICE.

ANDREW OLSON, OF CLEVELAND, OHIO, ASSIGNOR TO THE CLEVELAND FOLDING MACHINE COMPANY, OF CLEVELAND, OHIO, A CORPORATION OF OHIO.

AUTOMATIC RELEASING MECHANISM.

Application filed March 11, 1925. Serial No. 14,702.

My invention relates to improvements in automatic releasing mechanism as particularly adapted for a friction drive, and has for its object the provision of means for automatically releasing the friction drive of various machines, preferably accompanied by the application of a brake, immediately upon the occurrence of abnormal conditions with respect to such machines.

My invention is especially applicable for use with or upon sheet-feeding machines and will be described in connection with such embodiment whereon various means primarily dependent upon a suitable automatically operated appliance, such as a sheet detector, may be employed for stopping the feeding of the sheets, but I have directed my instant improvement toward the automatic disconnection of the members of a friction drive, associated with means for concurrently applying a brake to check the momentum of the machine.

Figure 2:
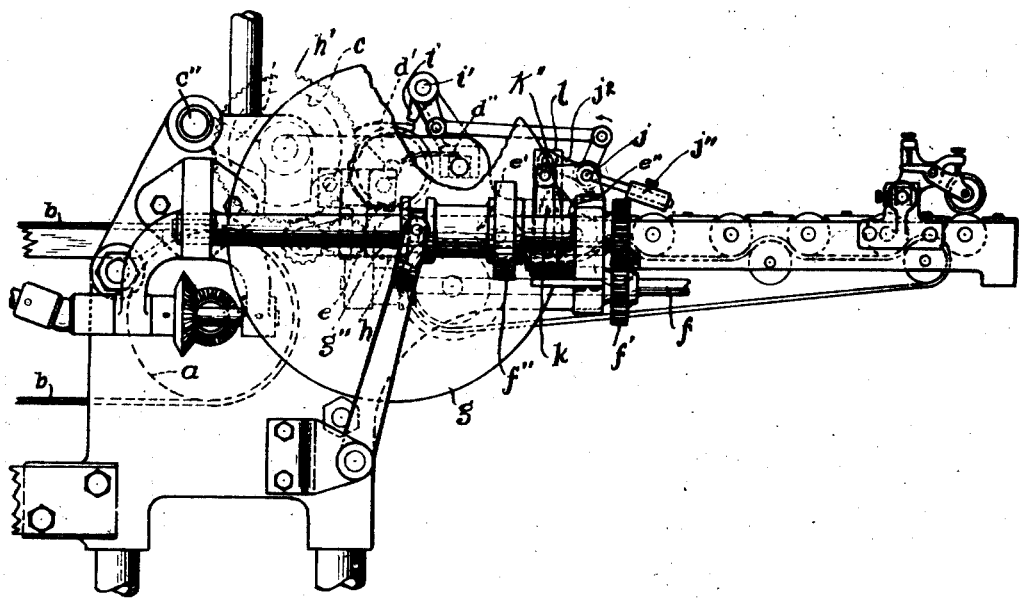
Figure 3:
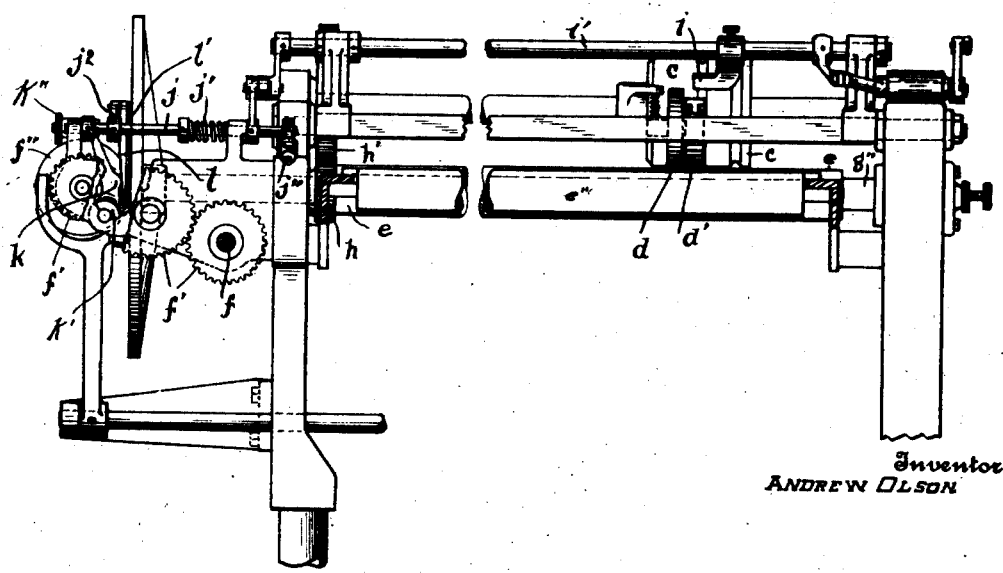

My present improvements may be briefly described as associated with a sheet-feeding machine equipped with a rotary suction member and further associated with a suitable mechanical sheet detector such as is described and claimed in the application of Hitchcock, Ser. No. 14,672, although any other automatic device operable by means of the irregular feeding of the sheets would come within the scope and intent of my disclosure. The sheet detector is associated with means acting directly upon one member of the friction drive and preferably the variably engaged disc thereof for disengaging it from its driving roll and applying frictional resistance to its continued rotation. The mechanism embodying my invention, together with sufficient of the co-operating machine parts may best be explained in connection with the accompanying drawings, wherein:

Figure 1 is a fragmentary plan view, centrally broken away, of a sheet-feeding machine to which my improvements are applied, Fig. 2 is a partial view thereof in side elevation, the friction drive being sectionally broken away, Fig. 3 is a transverse section on line 3—3, Fig. 1, Fig. 4 is a perspective view of somewhat diagrammatic character, illustrating the rotation of the detector by two sheets, shown of exaggerated thickness, and Fig. 5 is a fragmentary view illustrating the wedging action exerted against the friction disk.

Throughout the several figures of the drawings I have employed the same character of reference to indicate similar parts.

It will be understood from an inspection of the drawings that the sheet-feeding machine conveys the sheets of paper by means of the traveling bands or belts $b$ running over the terminal roller $a$ to advance said sheets from left to right. The sheets are presented to the rotary suction head $c$, supplied with an actuating suction through the pipes $c'$, $c''$, by which said sheets normally are advanced between the members of the sheet detector $d$ to the rollers $e$, $e'$, $e''$, etc., of the forwarding table upon the right of the drawings.

Power is applied to the machine by means of the shaft $f$ and to the instant advancing mechanism through the gearing $f'$ and the friction roll $f''$. This roll normally is in frictional engagement peripherally with the friction disc $g$, against which said disc is resiliently pressed by spring $g'$ through the end thrust of shaft $g''$. This shaft, by means of the gears $h$, $h'$, serves to rotate the suction head $c$ which advances the sheets from the belts $b$ to the members of the sheet detector $d$ and the rollers $e$, $e'$, etc., of the forwarding table. The sheet detector remains potentially operative, while permitting the passage of such sheets for which it is adjusted, as long as said sheets are presented one by one, as will be understood by those skilled in the art. However, upon the attempted or irregular passage of a plurality of sheets between the members of said detector, comprising the slightly eccentric member $d'$ and its driven roller $e$, the sheets will be gripped or pinched by the eccentric member sufficiently to rotate said member $d'$ and engage its extension $d''$ with the trip $i$, turning it in a contra-clockwise direction, Fig. 2. This serves to actuate its shaft $i'$, the link $i''$ and the connected cross shaft $j$ against the tension of the spring $j'$, Fig. 1, and the opposing adjustable counterweight $j''$.

Referring more particularly now to the lefthand portion of Fig. 3, it will be seen that the arm $j^2$, upon and movable with said cross shaft $j$, is pivoted to the upper end of the wedging member $l$, having a friction face $l'$ normally held slightly separated or apart from the disc $g$. Accordingly, upon the actuation of the shaft $j$ and its arm, $j^2$, through the connecting members just above indicated, said wedging member $l$ is forced downward between the abutment $k$ and disc $g$, thereby forcing the disc and its shaft slightly to the right and disengaging said disc from its driving roll $f''$. As shown upon the left, Figs. 1 and 3, the abutment $k$ preferably is in the form of a lever pivoted at its lower end $k'$ and provided at its upper end with a screw adjustment $k''$ whereby the effective operative position of the wedge $l$ may be regulated. By one and the same movement of this wedging member, it will be seen, not only is the power cut off from the suction head, but a positive brake concurrently is applied to the face of said friction disc, whereby the momentum of the rotating parts driven through its gearing may instantly be checked.

Having now described the preferred embodiment of my invention and its mode of operation sufficiently to disclose the principle and advantages thereof, I claim as new and desire to secure by Letters Patent, the following:

1. In a releasing mechanism of the class described, the combination with two associated friction-drive members normally maintained in operative relation, resilient means for insuring normal frictional engagement therebetween, a wedging member adapted to be brought into engagement with one of said members for effecting the separation of the friction drive and serving as a brake device, and actuating means associated with the wedging member, substantially as set forth.

2. A driving and releasing mechanism of the class described, comprising a driving roll and a friction disc adapted to be actuated thereby, a resilient mounting for said disc, and disabling and braking means, comprising a wedging member connected for control by the sheet-detector and adapted to be forcibly engaged with the face of the friction disc for checking its rotation and separating it from the driving roll, substantially as set forth.

3. The combination with a power-driven roll, of a friction disc, a resilient mounting acting against said disc to effect its normal operative engagement with the roll, an abutment, and a wedging member adapted to be forced between said abutment and the friction disc, whereby to effect the separation of the same from its driving roll and apply a braking effect to the disc, substantially as set forth.

4. The combination with a power-driven roll, of a friction disc, a resilient mounting acting to effect the normal operative engagement of these members, an abutment, adjusting means associated therewith, and a wedging member to be forced between said abutment and the friction disc, whereby to effect the separation of the disc driving roll, substantially as set forth.

5. In driving and releasing mechanism of the class described, the combination with the driving and driven members of a friction drive, of disabling means therefor, comprising coacting adjusting mechanism and composite normally inoperative separating and braking means, adapted both to engage and check the movement of the driven member, substantially as set forth.

In testimony whereof I do now affix my signature.

ANDREW OLSON.